United States Patent [19]
Yager et al.

[11] Patent Number: 5,165,831
[45] Date of Patent: Nov. 24, 1992

[54] CAPSCREW HEAD MARKINGS FOR TORQUE-ANGLE TIGHTENING

[75] Inventors: James H. Yager, Greensburg; Michael D. Hahn, Columbus, both of Ind.

[73] Assignee: Cummins Engine Company, Columbus, Ind.

[21] Appl. No.: 417,907

[22] Filed: Oct. 6, 1989

[51] Int. Cl.⁵ .............................................. F16B 31/02
[52] U.S. Cl. .................................... 411/14; 411/916; 73/761; 403/27
[58] Field of Search .................. 411/8, 13, 14, 378, 411/916; 73/761; 116/212, DIG. 34, 246; 403/27

[56] References Cited

U.S. PATENT DOCUMENTS

| | | | |
|---|---|---|---|
| 2,725,843 | 12/1955 | Koski | 116/212 |
| 2,889,729 | 6/1959 | Orner | 73/761 |
| 3,629,568 | 12/1971 | Hanes | 411/378 |
| 3,851,386 | 12/1974 | Ellzey | 116/212 |
| 4,317,585 | 3/1982 | Boice | 116/212 |
| 4,338,054 | 7/1982 | Dahl | 411/8 |
| 4,439,096 | 3/1984 | Rockwood | 411/8 |

FOREIGN PATENT DOCUMENTS

| | | |
|---|---|---|
| 1603768 | 6/1968 | Fed. Rep. of Germany . |
| 3327964 | 8/1983 | Fed. Rep. of Germany . |
| 699246 | 11/1979 | U.S.S.R. .................. 411/8 |
| 397701 | 8/1933 | United Kingdom ......... 411/14 |

*Primary Examiner*—Renee S. Luebke
*Assistant Examiner*—F. Saether
*Attorney, Agent, or Firm*—Sixbey, Friedman, Leedom & Ferguson

[57] ABSTRACT

A fastener which allows a user to easily utilize the Torque Angle Method to provide a predictable clamp load to a clamped element. The fastener includes an externally threaded shank portion, a torque receiving portion integrally connected on one end of the shank portion and a radially extending flange located between the shank portion and the torque receiving portion. The flange includes a pair of cut-out notches located on the peripheral edge of the flange which are formed prior to initial tightening of the fastener and are spaced apart at a predetermined angular distance to allow a user to utilize the Torque Angle method to provide predictable clamp load across a joint connection. Primarily, the method has three basic steps, first each of a plurality of fasteners is tightened to an intermediate torque, a mark is placed on the surface of the element to be clamped adjacent the leading one of the notches on the fastener and finally the fastener is rotated until the second notch of the pair is brought into alignment with the surface mark.

11 Claims, 2 Drawing Sheets

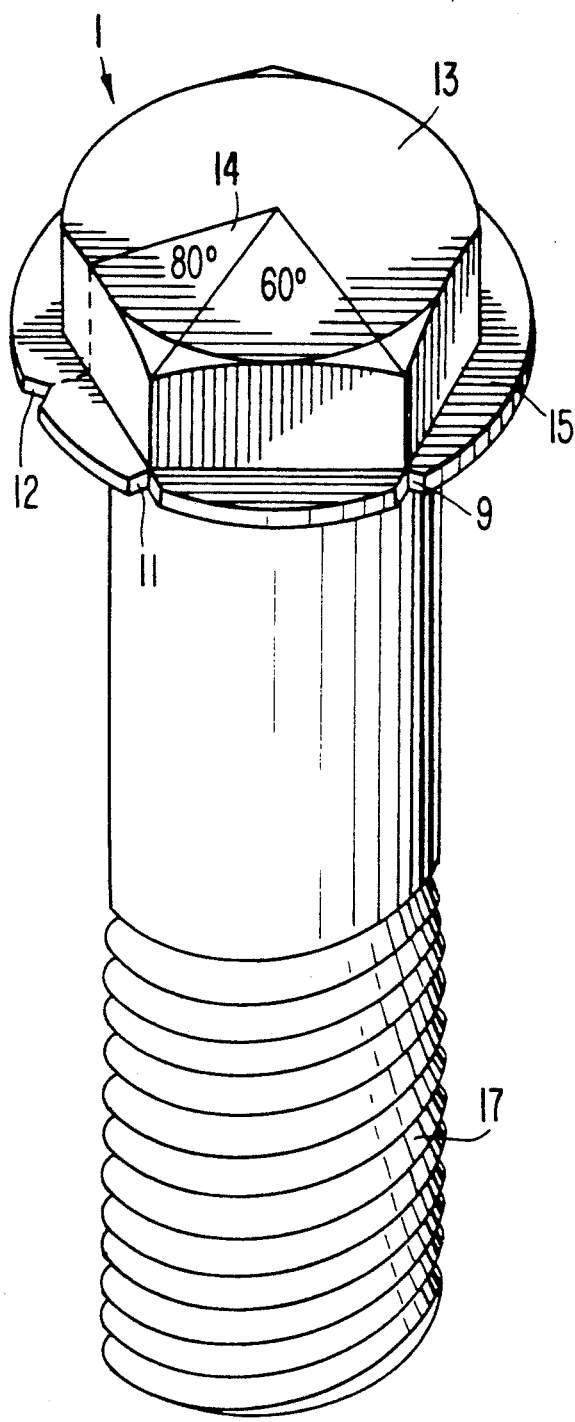
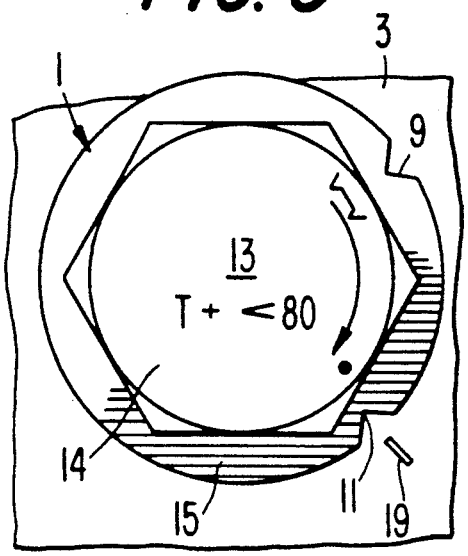
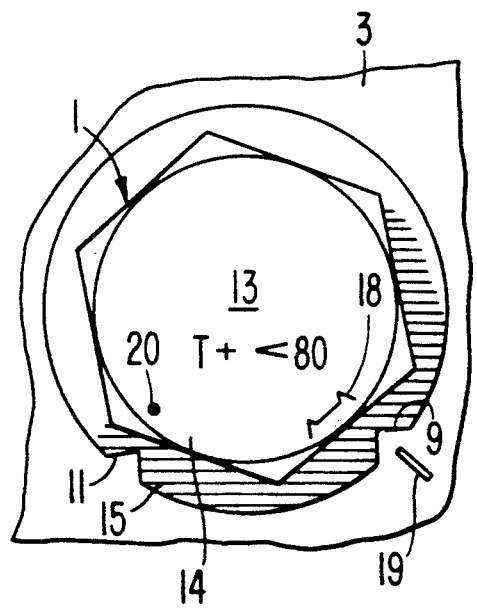

CAPSCREW HEAD MARKINGS FOR TORQUE-ANGLE TIGHTENING

TECHNICAL FIELD

This invention relates to a fastener including preformed notches or markings for use in providing a predictable and uniform clamp load across a plurality of fasteners by allowing a service technician to rotate the fastener a final predetermined angle, constant for each fastener, corresponding to a pair of markings separated by a predetermined angular distance.

BACKGROUND ART

Uniform clamp load across a plurality of fasteners is important for providing adequate coupling and reliable joint connections. The desirability of obtaining uniform clamping load can be especially important in certain critical areas of an internal combustion engine such as the main bearing caps for the crankshaft where proper uniform clamping load is essential to attain proper bearing cap functioning and service life. Various bolts or fasteners have been designed to indicate the amount of tension applied, but these are fairly complicated in design and use or require large manufacturing costs. For example, Liber (3,718,065) discloses a tension indicating fastener which includes a photoelastic strip wherein polarized light is directed toward the strip to measure fringe c der for determining binding stresses in the head which is linearly related to the bolt tension. This fastener, however, requires a calibration curve to determine bending stress from the fringe order which is not a time efficient system for a user. The tension indication means could also add significantly to the cost of such a bolt.

Torquing methods have also been utilized for application to ordinary fasteners. The traditional Torque Only method merely involves tightening a plurality of fasteners in an accepted pattern to a predetermined amount of torque using a common torque wrench which allows a user to read the amount of torque applied. However, even with an accurate torque wrench reading, the range of clamp loads in bolted joints using the Torque Only method has been found to be +/−25%.

A second method, the Torque Angle Method, has been developed which provides a range at joint connections of only +/−10%. This method requires at least three steps; first, the fastener is tightened to an intermediate torque common to each of the plurality of fasteners, second, a mark is scribed on the clamped element adjacent to the fastener head, such as in alignment with one of the six points on the hexagonal head typically provided. Next, the fastener is rotated a desired angular distance such as by aligning a succeeding point on the hexagonal head with the mark scribed on the clamped element. One of the disadvantages of this method is that in field service applications a user is limited to use of the points on the hexagonal head or must manually scribe 2 lines on the fastener separated by the predetermined angle. This requires time to mark the fastener, results in inaccuracies of the lines themselves, or generally limits a working angle to increments of 60 degrees because it is more expedient and efficient to scribe the clamped element in alignment with one of the points on a hexagonal head. Further, the manual application of the Torque Angle method does not provide an adequate means to check the torque applied across the fasteners. Because of these disadvantages caused by the manual nature of the Torque Angle Method, the more limited deviation of +/−10% cannot readily be recognized and the additional time required of a user to scribe the fastener may cause him to abandon the Torque Angle Method for the Torque Only Method. Permanent angle markings located on a circular dial have been used on an internal hardness tester disclosed in Fietz (3,283,567) but this device is limited to substance hardness determinations. Therefore, a more efficient fastener is necessary to reduce the disadvantages of the Torque Angle Method so that users can more easily utilize the method and receive its advantages over other methods.

SUMMARY OF INVENTION

A primary object of the present invention therefore is to provide a fastener which is formed to allow a user to readily, inexpensively and accurately utilize the Torque Angle Method to achieve a desired fastening force.

Another object of the present invention is to provide a fastener which includes preformed, permanent marks corresponding to a predetermined angular distance to facilitate a simple means to employ the Torque Angle Method.

Yet another object of the present invention is to provide a fastener comprising an externally threaded shank portion, a torque receiving portion integrally connected to one end of the shank portion, and an angular mark receiving portion including at least a pair of position marks spaced apart by a predetermined angular distance for allowing the fastener to be rotated through this distance after being tightened to a predetermined torque by forming a surface mark placed on the surface of the element being clamped adjacent the leading one of the position marks followed by an angular advance of the fastener to align the second position mark with the surface mark.

Still another object of the present invention is to provide a fastener further including an angular mark receiving portion comprising a flange located between a shank portion and a torque receiving portion which extends outwardly beyond the torque receiving portion to allow the position marks to remain visible during fastener tightening.

Still another object of the present invention is to provide a method for applying a predictable clamp load to an element clamped by a fastener having a threaded shank portion and a torque receiving portion integrally connected to one end of the shank portion, and an angular mark receiving portion including at least a pair of position marks, the method including the steps of rotating the fastener to a predetermined torque, placing a surface mark on the clamped element adjacent the leading one of said position marks, in the direction of tightening, and angularly advancing the fastener to align the trailing one of the position marks with the surface mark.

The present invention basically includes a fastener which has an externally threaded shank portion, a torque receiving portion integrally connected to one end of the shank portion and an outwardly extending flange located between the shank portion and the torque receiving portion. More specifically, the flange includes a pair of V-shaped cut-out notches located on the peripheral edge of the flange which are spaced apart at a predetermined angular distance to allow a service technician to utilize the Torque Angle Method. Primarily, the method has three basic steps, first each of a plurality of fasteners is tightened to an intermediate torque, a mark is placed adjacent the leading position indicating notch in the direction of fastener tightening, and finally the fastener is rotated until the trailing position indicating notch is brought into alignment with the surface mark.

The various features, objects, and advantages of the present invention will become apparent from the following Brief Description of the Drawings and Detailed Description of the Preferred Embodiment.

BRIEF DESCRIPTION OF THE DRAWINGS

FIG. 2 is a perspective view of the top and side view of the fastener including the capscrew head markings.

FIG. 3 is a top view of the fastener before final rotation on a main bearing housing.

FIG. 4 is a top view of the fastener after final rotation on a main bearing housing.

DETAILED DESCRIPTION OF THE PREFERRED EMBODIMENT

Figure 1:
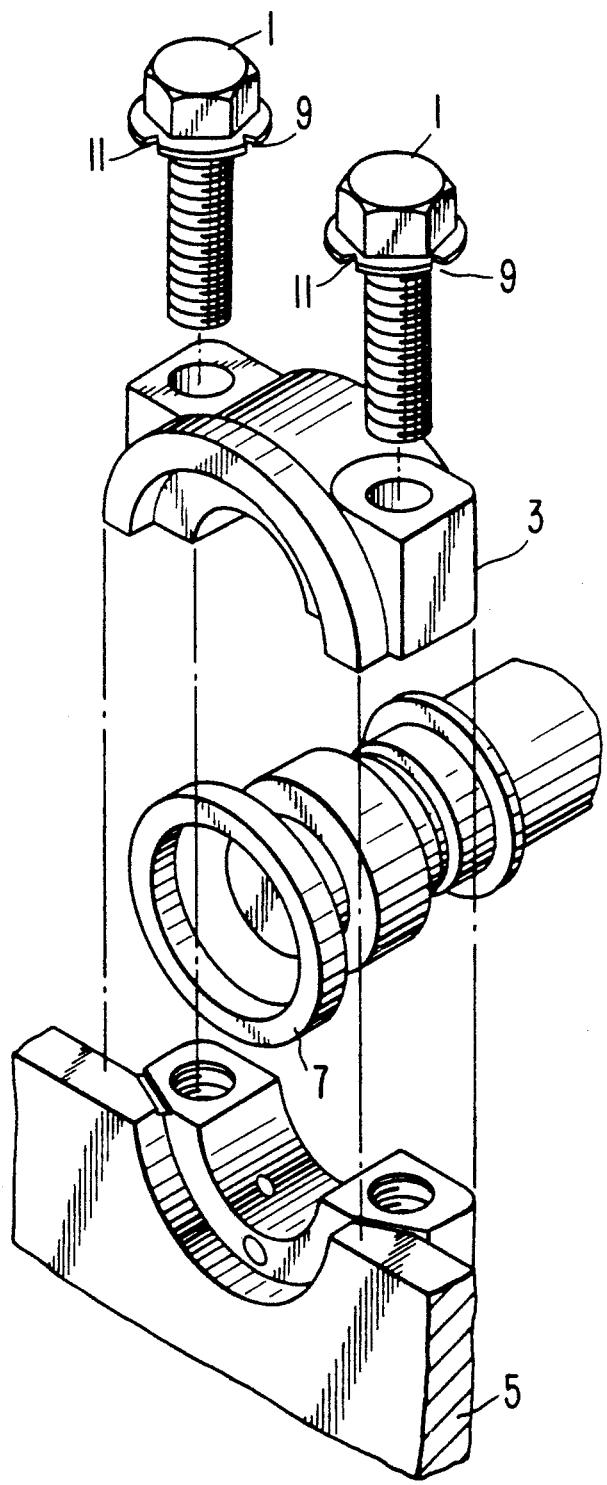
FIG. 1 is a perspective view of the top of a plurality of fasteners located on a bearing structure of an internal combustion engine camshaft.

For a clear understanding of the subject invention, reference is initially made to FIG. 1 in which a plurality of fasteners 1 designed in accordance with the subject invention are shown connecting a bearing structure 3 to engine block 5 for retaining camshaft 7. In particular, the fasteners designed in accordance with the subject invention allow a user to apply a torque angle method for providing a more uniform clamp load among a plurality of fasteners to create more reliable and durable joint connections which can in turn prolong the life and durability of the clamped element(s). First and second notches 9 and 11, respectively, provide the user with a readily identifiable angular distance of rotation to allow completion of the final step of the torque angle method.

The unique elements of fastener 1 will be better understood after an explanation of the formation and method of using fasteners designed in accordance with the subject invention to provide uniform clamp load across joint connections.

Fastener 1 may be in the form of a normal capscrew having an hexagonal torque receiving portion 13 more commonly referred to as a head. Further, torque receiving portion 13 is integrally connected to one end of externally threaded shank 17 which allows fastener 1 to threadedly engage a matingly threaded receiving bore. An important consideration when plural fasteners are involved is to apply a common torque load across the joint connection. The Torque Only method in which each fastener is tightened to a predetermined torque amount applied to each in a designated pattern is commonly used to attempt to provide a uniform clamp load. However, even with a sophisticated torquing wrench having an accurate indicating dial, the clamp load among a plurality of fasteners has been found to deviate as must as +/−25%.

An improved method is the Torque Angle method as discussed in the Background of the Invention. The present invention greatly facilitates the use of this method. Referring to FIG. 2, fastener 1 is clearly shown to include torque receiving portion 13 which is connected to one end of externally threaded shank portion 17. Flange 15 is also shown to extend symmetrically and radially outward from fastener 1 and preferably is located between torque receiving portion 13 and shank 17. Included on flange 15 is a V-shaped first notch 9 and V-shaped second notch 11 located on the outer periphial edge of flange 15. Clearly, flange 15 is not required because notches 9 and 11 could also be included on torque receiving portion 13. However, flange 15 does allow notches 9 and 11 to remain more readily visible, even when a wrench is attached during tightening, which is especially important during final rotation. First and second notches, 9 and 11, respectively, are separated by an angular distance corresponding to a predetermined value equal to the final distance through which fastener 1 is rotated to complete the Torque Angle method. A third notch 12 is also provided in flange 15. Both notch 11 and 12 have common notch 9 as their angular starting points. Indicia on torque receiving portion 13 corresponding to each of the angular distances clearly provides the user with the required points of reference for application of the Torque Angle Method. The angular distance of separation is commonly 60 degrees, however, because the notches are made during the actual forming of the fastener any desired distance is available to a manufacturer including more than one pair of angular distances. See FIG. 2. Quantifying indicia 14 may also be included on torque receiving portion 13 to clearly indicate the magnitude of the angular distances separating each pair of position marks.

As stated above, notches 9 and 11 are formed on fastener 1 during the original forming. More specifically, the forming die for fastener 1 may include features for providing fastener 1 with pairs of notches spaced any desired distance apart. Because this occurs during original forming, there is no increase in manufacturing costs. Notches may also be made after casting. Further, notches 9 and 11 will provide a greater incentive for a service technician to utilize the Torque Angle method because lines are no longer required to be scribed on the fastener itself. By providing more than one pair of notches, the fastener is more economical due to its greater degree of applications.

Referring now to FIGS. 3 and 4, the Torque Angle method as applied to the present invention becomes readily apparent. FIG. 3 illustrates a fastener 1 after each of the plurality of similar fasteners have been tightened to an initial torque value using a standard torque wrench. A mark 19 must then be scribed on the surface of bearing structure 3 adjacent the leading notch which is the furthest removed in the direction of rotation from the second notch of the pair on flange 15, notch 11. Further, torque receiving portion 13 may also include on its surface window 18 and dot 20 corresponding to notches 9 and 11, respectively. Dot 20 provides a user with a second point for aligning surface mark 19. Finally, fastener 1 is rotated through the final predetermined angular distance which occurs by continuing the rotation until the trailing notch of the pair, notch 9, is adjacent to surface mark 19. Window 18 provides the user with a larger range for properly aligning notch 9 with surface mark 19. See FIG. 4. Because the user is not required to physically scribe lines onto the fastener the accuracy of uniform clamp load across a joint connection will be increased and the Torque Angle method will be much easier to apply.

INDUSTRIAL APPLICABILITY

A fastener designed in accordance with the present invention has particular utility for joint connections found in an internal combustion engine where uniform clamp load is critical to proper engine performance.

The ability to form the fastener to include at least a pair of notches spaced apart by predetermined angular distance will not substantially increase manufacturing costs for the fastener. Moreover, the convenient design allows more accurate application of the Torque Angle method, and a service technician will be more inclined to use the method. It is understood, however, that various additional changes and modifications in the form and detail detail of the present invention illustrated in detail above may be made without departing from the scope and spirit of the present invention as well as the invention's use in a variety of applications. It is therefore, the intention of the inventors to be limited only be the following claims.

We claim:

1. A fastener for providing a predictable clamp load to a clamped element by means of a torque angle method comprising an externally threaded shank portion, a torque receiving means integrally connected to one end of said shank portion for receiving torque to tighten the fastener, and an angular mark receiving means located adjacent said torque receiving means and integrally attached thereto in a position to be viewed when the fastener is applying a clamping load and said shank portion is hidden from view within a clamped element wherein said angular mark receiving means includes at least a pair of position marks permanently formed thereon prior to initial tightening of the fastener and spaced apart by any predetermined angular, ranging from 0 to 360 degrees in the direction required for fastener tightening for indicating when the fastener has been rotated through said predetermined angular distance after being tightened to a predetermined torque and after a surface mark placed on the surface of the clamped element is aligned with the leading one of said position marks followed by an angular advance to align the trailing one of said position marks with said surface mark wherein said angular mark receiving means includes a perimetric boundary and said position marks extend radially inwardly from said perimetric boundary into the interior of said angular mark receiving means.

2. A fastener as set forth in claim 1 wherein said position marks are separated by an angular distance of sixty degrees.

3. A fastener as set forth in claim 1 wherein said position marks are separated by an angular distance of eighty degrees.

4. A fastener for providing a predictable clamp load to a clamped element by means of a torque angle method comprising an externally threaded shank portion, a torque receiving means integrally connected to one end of said shank portion for receiving torque to tighten the fastener, and an angular mark receiving means located adjacent said torque receiving means and integrally attached thereto in a position to be viewed when the fastener is applying a clamping load and said shank portion is hidden from view within a clamped element wherein said angular mark receiving means includes at least a pair of position marks permanently formed thereon prior to initial tightening of the fastener and spaced apart by a predetermined angular distance in the direction required for fastener tightening for indicating when the fastener has been rotated through said predetermined angular distance after being tightened to a predetermined torque and after a surface mark placed on the surface of the clamped element is aligned with the leading one of said position marks followed by an angular advance to align the trailing one of said position marks with said surface mark wherein said angular mark receiving means includes a radial flange located between said shank portion and said torque receiving means, said radial flange extending outwardly to allow said pair of position marks to remain visible during fastener tightening.

5. A fastener as set forth in claim 4 wherein each said position mark comprises a V-shaped cut-out located along the periphial edge of said flange.

6. A fastener as set forth in claim 4, wherein said angular mark receiving means comprises a plurality of pairs of position marks having at least one common position mark to allow a plurality of differing angular distances to be indicated on a single fastener.

7. A fastener as set forth in claim 6, further comprising angular distance quantifying indicia to indicate the magnitude of the angles separating each said plurality of pairs of position marks.

8. A fastener as set forth in claim 6, wherein said torque receiving means is a hexagonal head and at least one position mark of said plurality of pairs of position marks is located intermediate the ends of one of the faces of said hexagonal head.

9. A fastener for providing a predicatable clamp load to a clamped element by means of a torque angle method comprising an externally threaded shank portion, a torque receiving means integrally connected to one end of said shank portion for receiving torque to tighten the fastener, and an angular mark receiving means located adjacent said torque receiving means and integrally attached thereto in a position to be viewed when the fastener is applying a clamping load and said shank portion is hidden from view within a clamped element wherein said angular mark receiving means includes at least a pair of position marks permanently formed thereon prior to initial tightening of the fastener and spaced apart by a predetermined angular distance in the direction required for fastener tightening for indicating when the fastener has been rotated through said predetermined angular distance after being tightened to a predetermined torque and after a surface mark placed on the surface of the clamped element is aligned with the leasing one of said position marks followed by an angular advance to align the trailing one of said position marks with said surface mark wherein said angular mark receiving means comprises a plurality of pairs of position marks having at least one common position mark to allow a plurality of differing angular distances to be indicated on a single fastener.

10. A fastener as set forth in claim 9 further comprising angular distance quantifying indicia to indicate the magnitude of the angles separating each of said plurality of pairs of position marks.

11. A fastener as set forth in claim 9 wherein said torque receiving means is a hexagonal head and at least one position mark of said plurality of pairs of position marks is located intermediate the ends of one of the faces of said hexagonal head.

* * * * *